(12) United States Patent
Lowe et al.

(10) Patent No.: US 8,953,826 B2
(45) Date of Patent: Feb. 10, 2015

(54) SYSTEM, METHOD AND APPARATUS FOR TELEVISION SPEAKER CONFIGURATION

(71) Applicants: Kenneth Lowe, San Juan Capistrano, CA (US); William Wang, Irvine, CA (US)

(72) Inventors: Kenneth Lowe, San Juan Capistrano, CA (US); William Wang, Irvine, CA (US)

(73) Assignee: Vizio, Inc., Irvine, CA (US)

( * ) Notice: Subject to any disclaimer, the term of this patent is extended or adjusted under 35 U.S.C. 154(b) by 0 days.

(21) Appl. No.: 13/915,100

(22) Filed: Jun. 11, 2013

(65) Prior Publication Data

US 2013/0278839 A1    Oct. 24, 2013

Related U.S. Application Data

(63) Continuation of application No. 12/512,263, filed on Jul. 30, 2009, now Pat. No. 8,462,967.

(51) Int. Cl.
| | |
|---|---|
| H04R 5/02 | (2006.01) |
| H04N 5/60 | (2006.01) |
| H04N 5/64 | (2006.01) |
| H04R 5/04 | (2006.01) |
| H04N 21/485 | (2011.01) |
| H04R 1/02 | (2006.01) |
| H04S 7/00 | (2006.01) |

(52) U.S. Cl.
CPC .................. *H04N 5/607* (2013.01); *H04N 5/60* (2013.01); *H04N 5/642* (2013.01); *H04R 5/04* (2013.01); *H04N 21/4852* (2013.01); *H04N 21/485* (2013.01); *H04R 1/02* (2013.01); *H04R 5/02* (2013.01); *H04R 2499/15* (2013.01); *H04S 7/301* (2013.01)
USPC ........... 381/306; 381/120; 381/123; 381/386; 348/738; 345/156

(58) Field of Classification Search
CPC ............ H04R 5/02; H04R 1/025; H04R 3/00; H04R 5/04; H04R 1/26; H04R 2499/15; H04R 3/12; H04N 5/60; H04N 5/607; G06F 3/016; G06F 3/017; G06F 3/038; G06F 3/0346; G06F 3/011
USPC .................. 381/120, 123, 306, 386; 348/738; 345/156
See application file for complete search history.

(56) References Cited

U.S. PATENT DOCUMENTS

| | | | |
|---|---|---|---|
| 2002/0131611 A1* | 9/2002 | Hoover et al. | ................ 381/123 |
| 2009/0147134 A1 | 6/2009 | Iwamatsu | |
| 2009/0245538 A1 | 10/2009 | Tomita | |

* cited by examiner

*Primary Examiner* — Paul S Kim
(74) *Attorney, Agent, or Firm* — Law Office of Scott C. Harris, Inc.

(57) ABSTRACT

An application for present invention includes a television with a set of speaker outputs including at least a left speaker and a right speaker. On screen displays are used to properly configure the speakers and assure maximum audio quality from the television. In some embodiments, a cross-point switch connects the speakers attached to the television with the correct outputs of an internal amplifier.

21 Claims, 7 Drawing Sheets

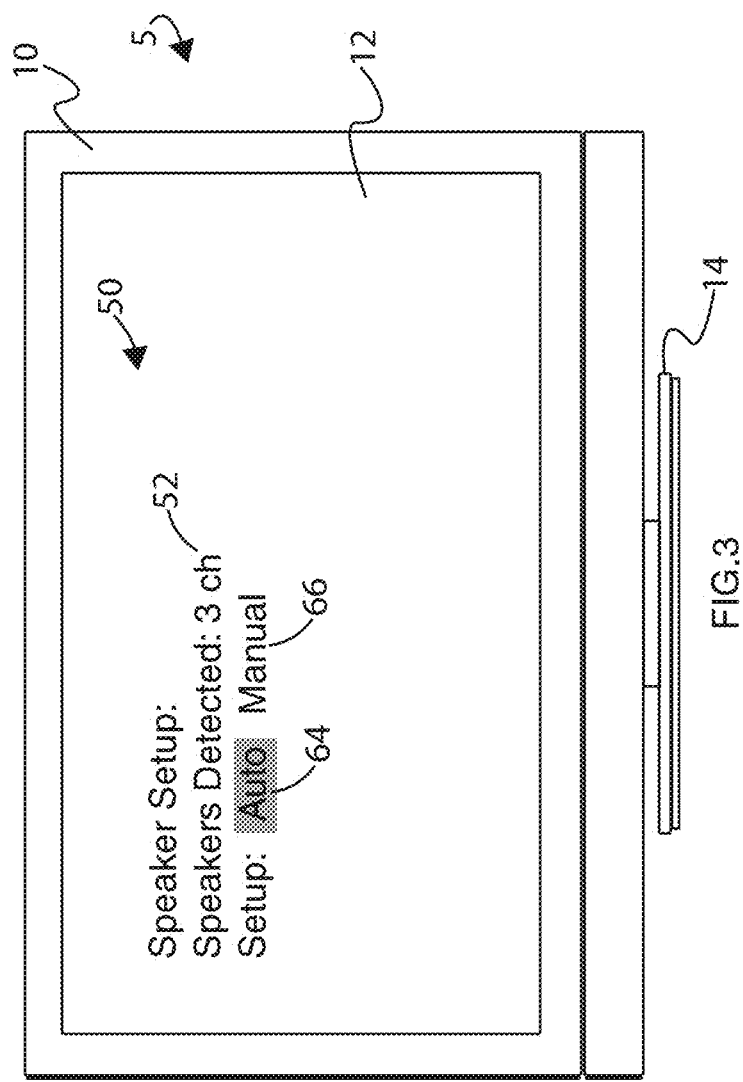

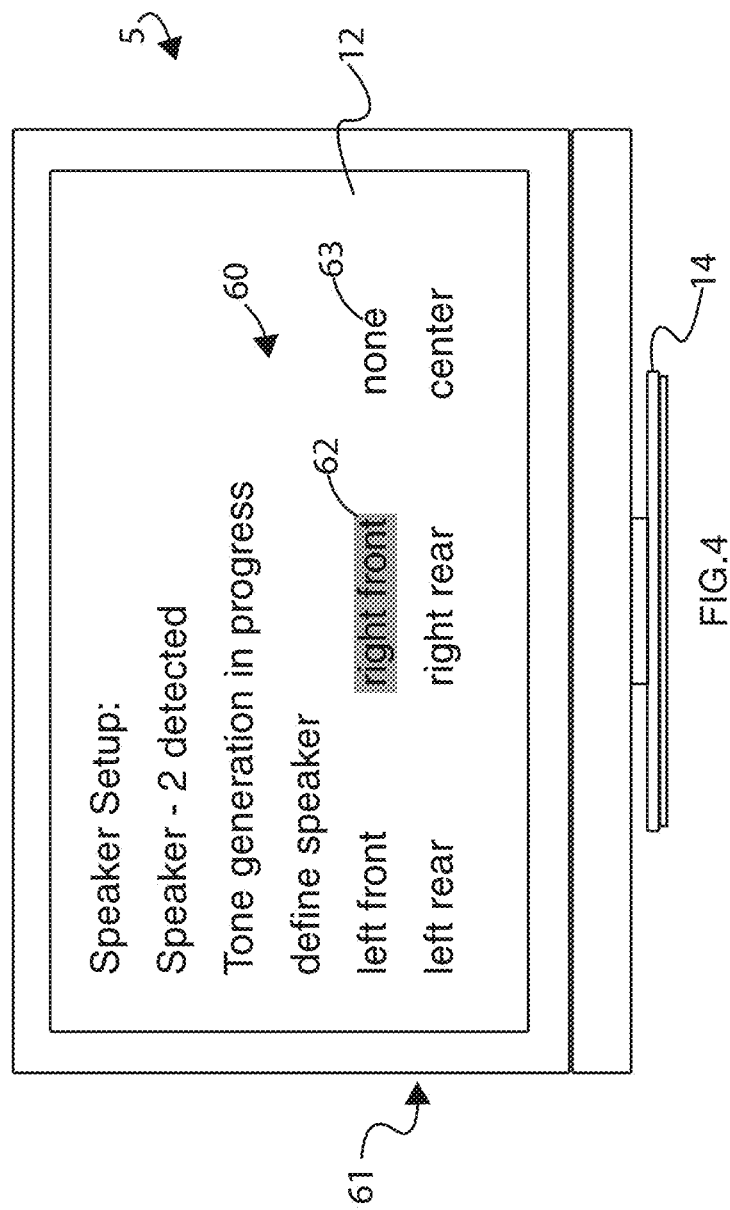

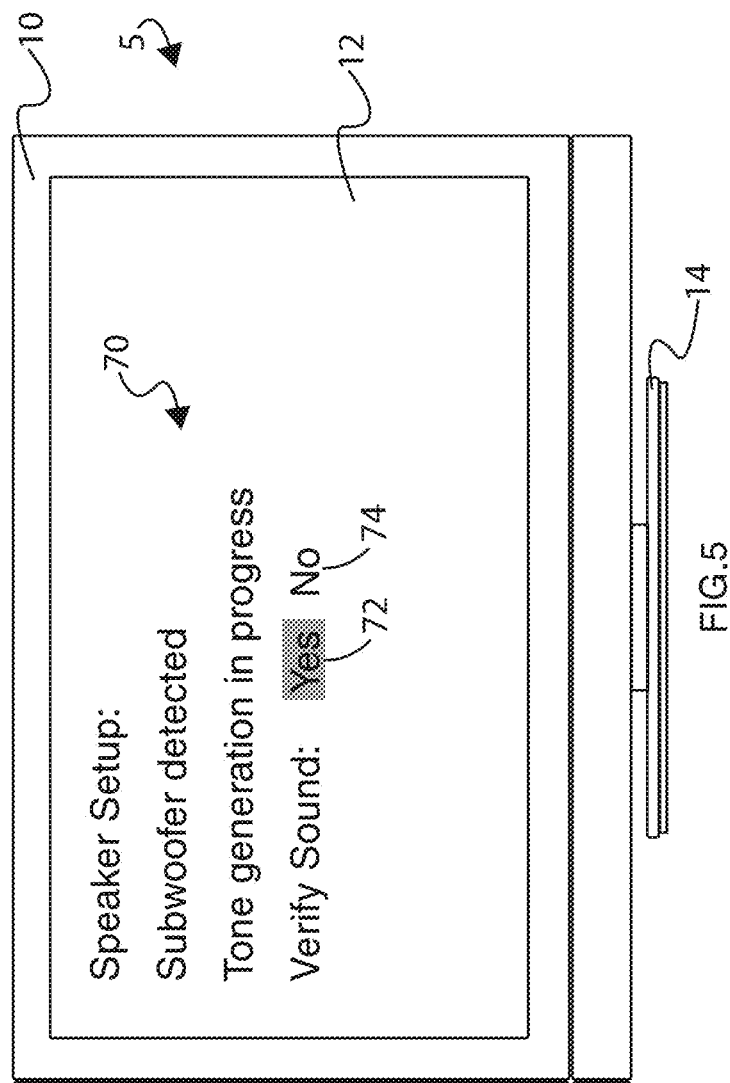

SYSTEM, METHOD AND APPARATUS FOR TELEVISION SPEAKER CONFIGURATION

CROSS-REFERENCE OF RELATED APPLICATION

This application is a continuation application of U.S. Ser. No. 12/512,263 filed Jul. 30, 2009, now U.S. Pat. No. 8,462,967 issued Jun. 11, 2013, the disclosure of which is herewith incorporated by reference in their entirety.

FIELD OF THE INVENTION

This invention relates to the field of television devices and more particularly to a television speaker system and configuration of such.

BACKGROUND OF THE INVENTION

Television devices such as LCD or Plasma televisions provide audio and video content such as television programs, movies, etc.

Existing television sets include audio amplification and delivery through one or more internal speakers, providing adequate audio for many users. This audio quality is severely limited by the space allotted to such speakers (e.g., only 2" wide speakers will fit in certain television cabinets) and to the baffling provided by the television enclosure. This limits the sound quality including maximum volume, response curve shape and breadth, distortion, etc.

To improve the audio experience associated with the television, many users augment the television sound system with an external amplifier. In this, the audio outputs of the television are connected to audio inputs of the amplifier, and then speakers connected to the amplifier are used to reproduce the audio instead of the speakers that are internal to the television. The speakers connected to the amplifier often provide better sound quality and some are often specialized for certain response curves such as a base speaker (subwoofer) and the center speaker (generally used for voices).

It is often difficult to correctly wire and configure the speakers to the external amplifier and often, unwary listeners have the right and left speakers swapped or a front and rear speaker swapped, etc. This is hard to detect when listening to music, but when watching television, often audio artifacts are used to create illusional effects (e.g., the effect of a car moving from left to right on your television). If the speakers are set up inconsistently, the action on the television will not match the audio experience.

What is needed is a television system that will provide enhanced audio quality through external speakers and utilize advance capabilities to configure these speakers.

SUMMARY

The present invention includes a television with a set of speaker outputs including at least a left speaker and a right speaker. On screen displays are used to properly configure the speakers and assure maximum audio quality from the television.

In one embodiment, a system for configuring speakers associated with a television is disclosed including a display panel with a processing element coupled to the display panel. There are multiple speakers associated with the television and an amplifier within the television and having multiple amplifier outputs. A cross-point switch in the television has cross-point switch inputs and cross-point switch outputs. The cross-point switch inputs are connected to each of the amplifier outputs and the cross-point switch outputs are connected to each of the speakers. The cross-point switch selectively connects a plurality of pairs of cross-point switch inputs and cross-point switch outputs under control of the processing element. Software running on the processing element determines proper connections between each of the speakers and each of the amplifier outputs and controls the cross-point switch to connect each of the amplifier outputs to each of the speakers based upon the proper connections.

In another embodiment, a method of configuring speakers associated with a television is disclosed including determining a proper configuration of at least two speakers associated with the television by a processing element of the television and then connecting each of the speakers to an associated amplifier output of an amplifier that is internal to the television.

In another embodiment, a television with configurable external speakers is disclosed including a display panel with a processing element coupled to the display panel. There are multiple speakers associated with the television and an amplifier in the television having multiple amplifier outputs. Each amplifier output is connected to one of the speakers. Software running on the processing element determines a proper set of connections between each of the speakers and each of the amplifier outputs.

BRIEF DESCRIPTION OF THE DRAWINGS

The invention can be best understood by those having ordinary skill in the art by reference to the following detailed description when considered in conjunction with the accompanying drawings in which:

FIG. 3 illustrates a plan view of a typical on-screen display of the present invention.

FIG. 4 illustrates a plan view of a second typical on-screen display of the present invention.

FIG. 5 illustrates a plan view of a third typical on-screen display of the present invention.

DETAILED DESCRIPTION

Figure 1:
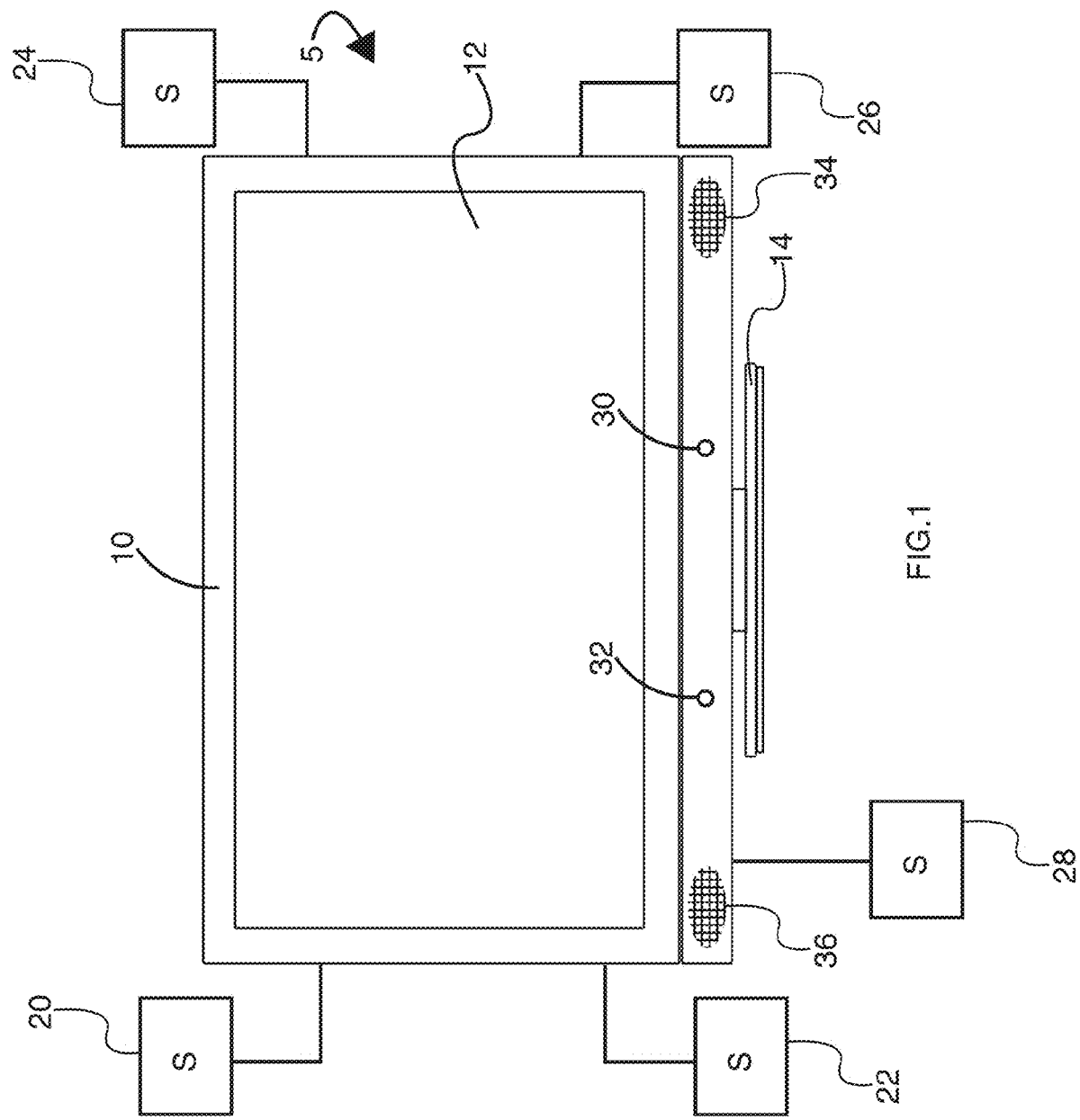
FIG. 1 illustrates a plan view of a television system of the present invention.

Reference will now be made in detail to the presently preferred embodiments of the invention, examples of which are illustrated in the accompanying drawings. Throughout the following detailed description, the same reference numerals refer to the same elements in all figures. The bezel of the present invention is the facing surface surrounding an image producing surface such as an LCD panel, CRT, Plasma panel, OLED panel and the like.

Referring to FIG. 1, a plan view of a television 5 of the present invention will be described. Typically, a bezel 10 is situated around the peripheral edge of the display panel 12. For completeness, though not required in the present invention, the television is shown on a stand 14.

Several speakers are shown connected to the television 5. A left front speaker 20, a left rear speaker 22, a right front speaker 24, a right rear speaker 26, a subwoofer 28 are shown, although any number and combination of speakers is anticipated including, for example, a center speaker. Two internal speakers 34/36 are also shown and, in some embodiments, the internal speakers are used as center speakers 34/36.

In this example, two microphones 30/32 are integrated into the bezel 10. The present invention uses audio from the microphone 30/32 to determine presence and location of sound from each of the speakers 20/22/24/26/28. As will be shown, the microphones 30/32 are used in some embodiments to determine proper configuration and operation of the speakers 20/22/24/26/28/34/36. Although two microphones 30/32 are shown to provide directionality detection, any number of microphones is anticipated including none, one and more than two.

Figure 2:
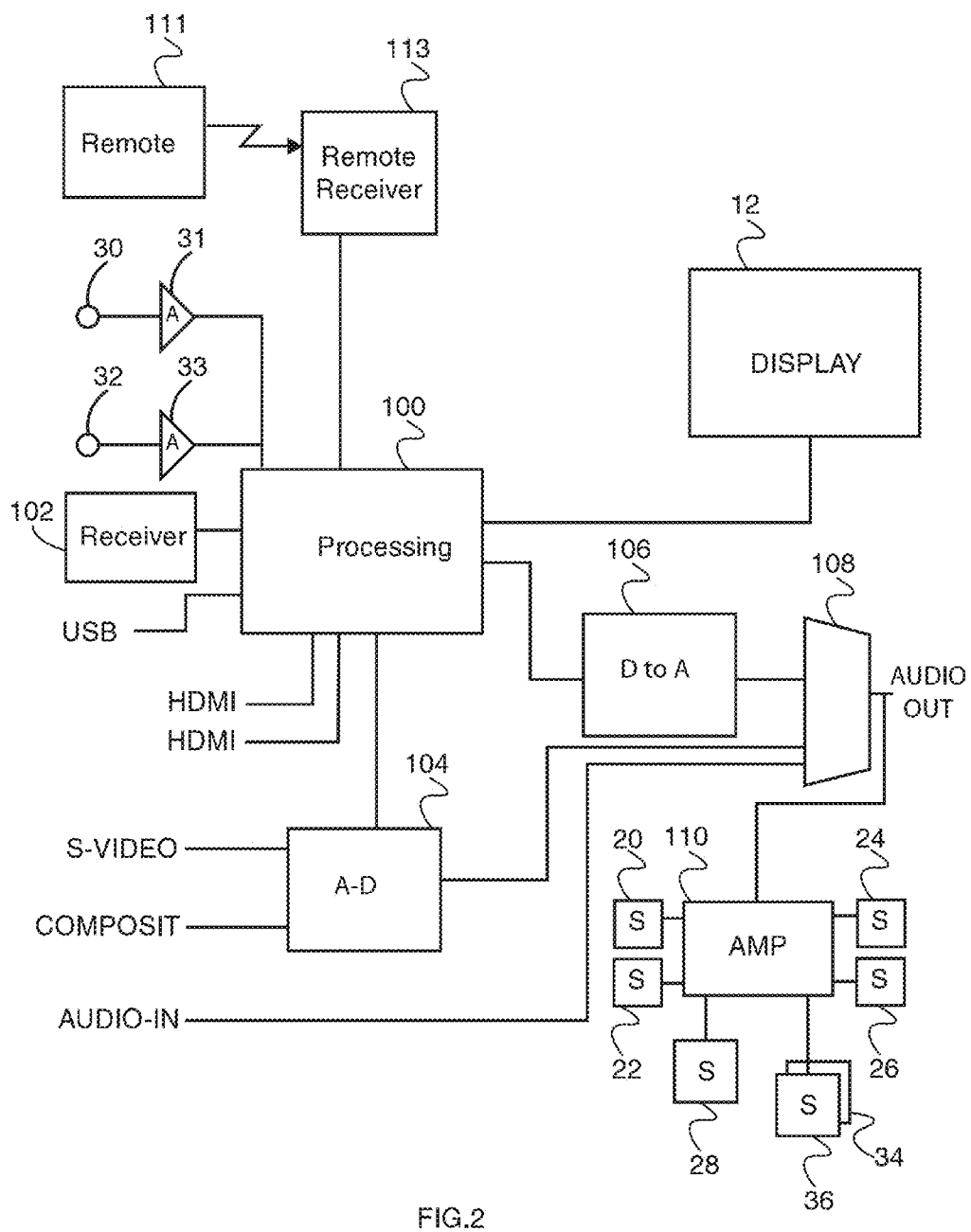
FIG. 2 illustrates a schematic view of a typical television system of the present invention.

Referring to FIG. 2, a schematic view of a typical television of the present invention will be described. This figure is intended as a representative schematic of a typical television 5 and in practice, some elements are not present in some monitors/televisions 5 and/or additional elements are present in some monitors/televisions 5. In this example, a display panel 12 is connected to a processing element 100. The display panel 12 is representative of any known display panel including, but not limited to, LCD display panels, Plasma display panels, OLED display panels, LED display panels and cathode ray tubes (CRTs).

The processing element 100 accepts video inputs and audio inputs selectively from a variety of sources including an internal television broadcast receiver 102, High-definition Media Inputs (HDMI), USB ports and an analog-to-digital converter 104. The analog-to-digital converter 104 accepts analog inputs from legacy video sources such as S-Video and Composite video and converts the analog video signal into a digital video signal before passing it to the processing element 100. The processing element 100 controls the display of the video on the display panel 12.

Audio emanates from either the broadcast receiver 102, the legacy source (e.g., S-Video) or a discrete analog audio input (Audio-IN). If the audio source is digital, the processing element 100 routes the audio to a digital-to-analog converter 106 and then to an input of a multiplexer 108. The multiplexer 108, under control of the processing element 100, selects one of the audio sources and routes the selected audio to the audio output and an internal audio amplifier 110. The internal audio amplifier 110 amplifies the audio and delivers it to internal speakers 34/36 as well as the external speakers 20/22/24/26/28.

The processing element 100 accepts commands from a remote control 111 through remote receiver 113. Although IR is often used to communicate commands from the remote control 111 to the remote receiver 113, any known wireless technology is anticipated for connecting the remote control 111 to the processing element 100 including, but not limited to, radio frequencies (e.g., Bluetooth), sound (e.g., ultrasonic) and other spectrums of light. Furthermore, it is anticipated that the wireless technology be either one way from the remote 111 to the receiver 113 or two way.

The processing element is also interfaced to the microphones 30/32 through amplifier and/or analog to digital converters 31/33. Interfacing of a microphone 30/32 through an analog to digital converter 31/33 is well known. Microphones 30/32 receive vibrations from sound and convert the vibrations into analog electrical signals. The analog to digital converters 31/33 convert the analog electrical signals into digital form for processing by the processing element 100.

Figure 2A:
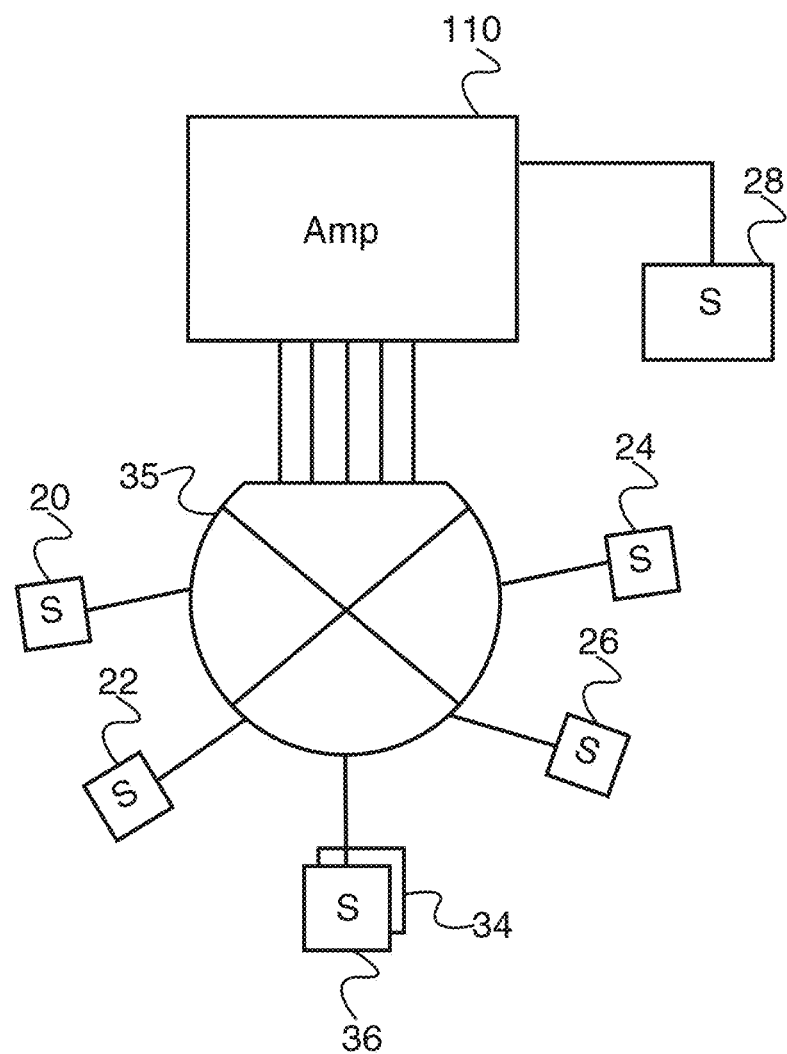
FIG. 2A illustrates a partial schematic view of another typical television of the present invention.

Referring to FIG. 2A, a second schematic view of a typical television of the present invention will be described. In this example, some of the speakers 20/22/24/26/34/36 are connected to the amplifier 110 of the television 5 through a cross-point switch or multiplexer 35. Some speakers 28, such as subwoofers, are specialized and are not interchangeable and, therefore are directly connected to the amplifier. The speakers 20/22/24/26/34/36 are connected to the amplifier 110 of the television 5 through a cross-point switch or multiplexer 35 to enable software configuration, connecting any (or some) physical speaker 20/22/24/26/34/36 to any output of the amplifier 110. Therefore, in a scenario in which a first amplifying element within the amplifier 110 is configured to deliver sound to the left-front speaker of the speakers 20/22/24/26/34/36 and the left-front speaker is connected to an input of the cross-point switch or multiplexer 35, then that input of the cross-point switch or multiplexer 35 is routed to that output of the amplifier 110 through the cross-point switch or multiplexer 35. Therefore, is anticipated that any of the speakers 20/22/24/26/34/36 are connected through the cross-point switch or multiplexer 35 to any output of the amplifier 110 eliminating the need for the installer to connect the correct speaker to the correct terminals (except the specialized speakers such as the sub-woofer 28). Once the speakers 20/22/24/26 are connected, it is determined which speaker 20/22/24/26 is connected to which output of the cross-point switch or multiplexer 35 and, the audio output of the amplifier 110 that is to be provided to that speaker 20/22/24/26 is routed from the associated amplifier element within the amplifier 110 to the appropriate speaker 20/22/24/26 through the cross-point switch or multiplexer 35.

Referring to FIG. 3, a plan view of a first typical on-screen display of the present invention will be described. Many user interfaces are known in the industry and the user interface of FIG. 3 is but one example. In this, a speaker setup on-screen display 50 is displayed on the display panel 12. The on-screen display 50 includes an indication of what speakers were detected 52 (e.g., 3-channel—left, right and center) and includes controls for automatic 64 or manual 66 setup.

Referring to FIG. 4, a plan view of a second typical on-screen display of the present invention will be described. Many user interfaces are known in the industry and the user interface of FIG. 4 is but one example. In this, a speaker setup on-screen display 60 includes an indication of what speakers were detected (e.g., two speakers—it is not known which one is left or right) and indicates that a tone generation is in progress and requests the user to indicate which speaker is making a sound 61. The user has highlighted the right front 62, indicating that the right-front speaker is making the sound. Upon pressing the select key, the system of the present invention will configure the multiplexer or cross point switch 35 to connect the speaker that was identified with the amplifier element of the amplifier 110 that is associated with the right front speaker. These steps are repeated until all speakers are identified. If no sound is heard, the user selects none 63 and the television system of the present invention, in some embodiments, presents a troubleshooting guide to the user.

Referring to FIG. 5, a plan view of a third typical on-screen display of the present invention will be described. Many user interfaces are known in the industry and the user interface of FIG. 5 is but one example. In this, a speaker setup on-screen display 70 includes an indication that a subwoofer 28 is detected or is required/known to be connected. The on-screen display 70 indicates that a tone is being sent to the subwoofer 28 and the user is presented with two choices, yes 72 and no 74 to indicate to the system whether the sound is reaching the subwoofer 28.

Figure 6:
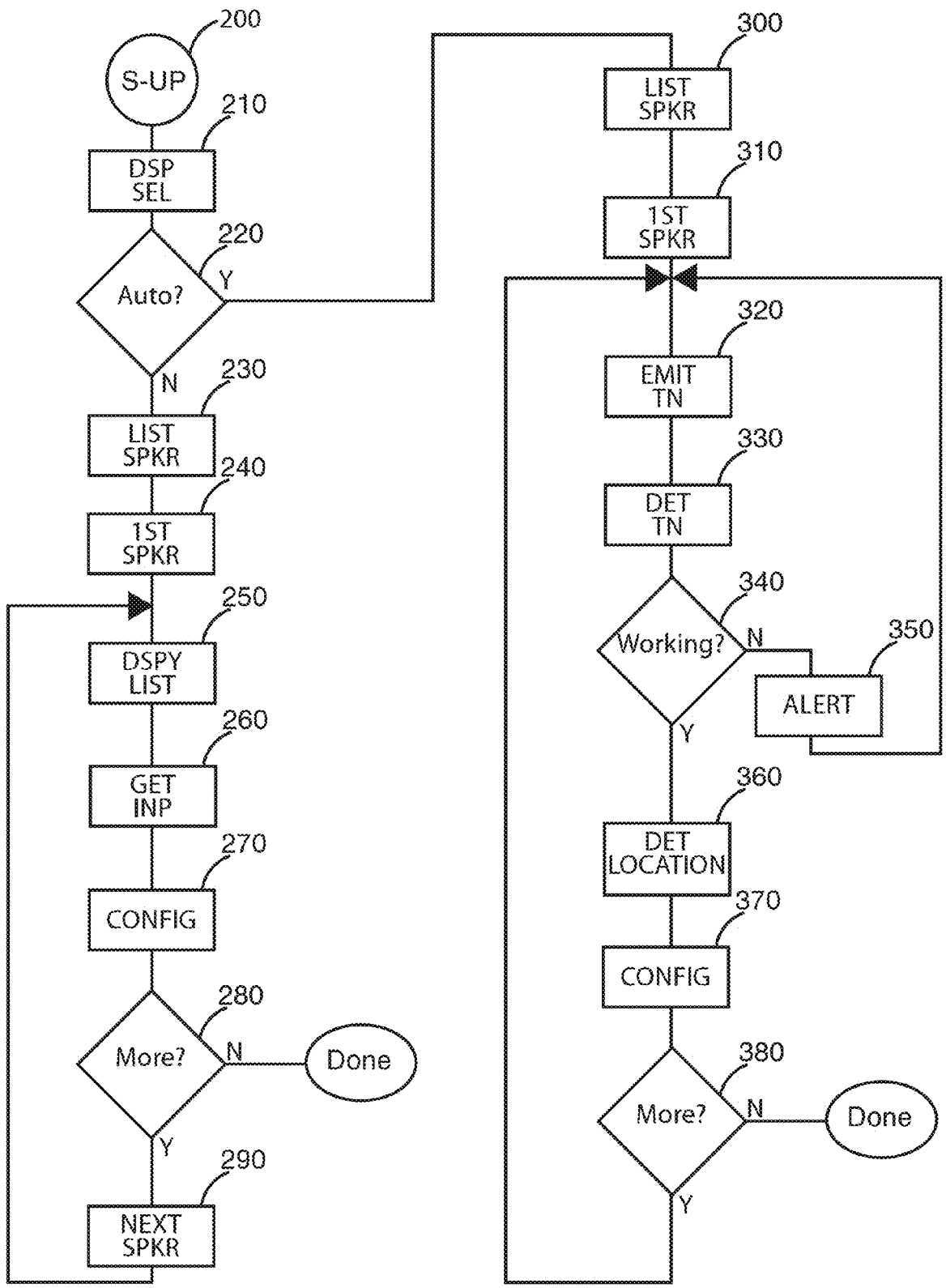
FIG. 6 illustrates a flow chart of the present invention.

Referring to FIG. 6, a flow chart of the present invention will be described. This is an exemplary program flow executed within the processing element 100 upon the viewer entering setup 200 (e.g., by command from the remote control 111 or by detection of a speaker connection that was not previously detected. First, an on-screen display is presented 210 that includes, for example, information about the speaker configuration and, if one or more microphones 30/32 are present, asks the viewer if they want to perform manual or automatic configuration 220. If the viewer requests manual configuration 220, a list of speakers is determined 230 and the first speaker of the list is activated (e.g., a tone is emitted to the first speaker) 240. Now, the viewer is asked (through the on-screen display) to identify which speaker is making the sound 250 and, responsive to the viewer's input 26, the speaker is connected to the amplifier associated with the identity 270 (e.g., if the viewer indicates that the left-front speaker is making the sound, then that speaker is connected to the left-front output of the amplifier 110). Next, if there are no more speakers to configure 280, then the method is complete. If there are more 280, then the next speaker is activated (sound generation) and the above steps starting with asking the viewer for identification 250.

If the viewer requests automatic configuration 220, a list of speakers is determined 300 and the first speaker of the list is activated 310 and a tone is emitted to the current speaker 320. Now, the microphones 30/32 (any number of microphones) are used determine if any speaker is emitting the sound 330. If no sound is detected 340, the viewer is alerted through an on-screen delay and the process continues until the user corrects the situation (e.g., connects the speaker). Next, the microphones 30/32 (any number of microphones) are used to triangulate the sound and determine which speaker is emitting the sound 360. Once the speaker is determined 360, the speaker is connected to the amplifier associated with the identity 370 (e.g., if the triangulation 360 indicates that the left-front speaker is making the sound, then that speaker is connected to the left-front output of the amplifier 110). Next, if there are no more speakers to configure 380, then the method is complete. If there are more 380, then the next speaker is selected 390 and the above steps are repeated starting with emitting sound from the next speaker 320.

Equivalent elements can be substituted for the ones set forth above such that they perform in substantially the same manner in substantially the same way for achieving substantially the same result.

It is believed that the system and method of the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A television system comprising:
   a television processor, producing a first output for a display, and a second output for sounds for plural speakers;
   an amplifier having a plurality of amplifier outputs, said amplifier having plural outputs for plural speakers;
   said amplifier including a switch that is controlled to connect said sound to said speakers,
   said television processor running a routine that determines which of said sounds is to be connected to which of said speakers and controls said switch to connect one of said sounds to each of said plural outputs based on said routine.

2. The system of claim 1, wherein said amplifier has an output to a subwoofer speaker that is not connected via said switch.

3. The system of claim 1, wherein the routine accepts viewer inputs to determine determines which of said sounds is to be connected to which of said speakers.

4. The system of claim 1, wherein the routine determines connections between each of the speakers automatically.

5. The system of claim 1, wherein the routine controls said switch to connect a first output from the amplifier to a first speaker at a first time, and to connect said first output from the amplifier to a second speaker at a second time based on said routine.

6. The system of claim 1, wherein the switch is a crosspoint switch.

7. The system of claim 1, wherein the routine automatically determines, among speakers, which among said speakers is a right speaker and which is a left speaker.

8. The system of claim 7, wherein the routine also automatically determines, among speakers, which among said speakers is a center speaker.

9. A method of operating a television comprising:
   using a television processor, producing a first output for a display, and a second output for sounds for plural speakers;
   creating multiple outputs for said plural speakers;
   using said television processor to run a routine that determines which of said multiple outputs is properly being connected to each of said speakers; and
   controlling an electronically-controllable switch to connect each of said multiple outputs to said speakers based on the determined carried out by said routine.

10. The method of claim 9, wherein said multiple outputs include an output to a subwoofer speaker that is not connected via said switch and further comprising connecting said output to said subwoofer directly to said subwoofer without said switch.

11. The method of claim 9, further comprising accepting viewer inputs to determine which of said sounds is to be connected to which of said speakers.

12. The method of claim 9, further comprising automatically determining connections between each of the speakers automatically.

13. The method of claim 9, further comprising controlling said switch to connect a first output to a first speaker at a first time, and to connect said first output to a second speaker at a second time based on said routine.

14. The method of claim 9, wherein the routine automatically determines, among speakers, which among said speakers is a right speaker and which is a left speaker.

15. The method of claim 14, wherein the routine also automatically determines, among speakers, which among said speakers is a center speaker.

16. A television system comprising:
   a processor, producing a first output for a television display, and a second output which includes plural sounds for plural speakers including at least left and right speakers;
   an amplifier having a plurality of amplifier outputs, said amplifier having plural outputs for said plural speakers;
   said amplifier including a switch that is controlled to connect said sound to said speakers,
   said processor running a routine that determines which of said speakers that are connected is a left speaker, and which of said speakers that are connected is a right speaker, and automatically connecting said plural sounds to said's plural speakers including at least said left and right speakers.

17. The system of claim 16, wherein said amplifier has an output to a subwoofer speaker that is not connected via said switch.

18. The system of claim 16, wherein the routine determines connections between each of the speakers automatically using a tone generator.

19. The system of claim 16, wherein the routine controls said switch to connect a first output from the amplifier to a first speaker at a first time, and to connect said first output from the amplifier to a second speaker at a second time based on said routine.

20. The system of claim 16, wherein the switch is a cross-point switch.

21. The system of claim 16, wherein the plural sounds also include sounds for a center speaker, and said routine also automatically connect sounds to said center speaker.

* * * * *